UNSYMMETRICAL HIGH DENSITY MAGNETIC RECORDING SYSTEM

Original Filed Feb. 1, 1961

INVENTOR.

ANDREW GABOR

BY

Douglas M. Clarkson

ATTORNEY

United States Patent Office 3,373,415

Patented Mar. 12, 1968

3,373,415

UNSYMMETRICAL HIGH DENSITY MAGNETIC RECORDING SYSTEM

Andrew Gabor, Huntington, N.Y., assignor to Potter Instrument Company, Inc., Plainview, N.Y., a corporation of New York Original application Feb. 1, 1961, Ser. No. 86,338. Divided and this application Nov. 4, 1964, Ser. No. 408,948

11 Claims. (Cl. 340—174.1)

ABSTRACT OF THE DISCLOSURE

This invention is a self-clocking magnetic recording in which one binary value is recorded solely by reversals at regularly spaced intervals and the other binary value is recorded as a transition at regularly spaced intervals plus a transition substantially in advance of the mid-points between the regular transitions.

Figure 1:
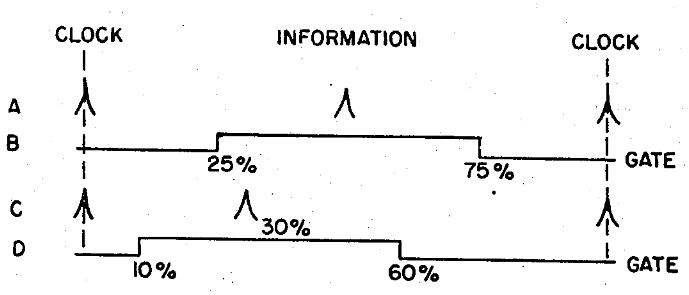

The present invention, generally, concerns magnetic recording and, more particularly, methods of and means for high density magnetic recording with self-clocking characteristics.

This is a division of Ser. No. 86,338, filed Feb. 1, 1961, which has been abandoned.

Digital information is recorded in binary form by providing transitions in the state of the recording medium at the information bit cell boundaries, which may be considered "clock" markers, and by providing transitions intermediate these cell boundaries in accordance with the information to be recorded. The information is represented either by a change in one of the two possible states of the binary or by an absence of a change.

It has been found, according to the present invention, that, due to jitter in any practical recording and playback system, increased reliability can be attained if the informational transition is placed in advance of the cell mid-point. The problem in playing back recorded information of the form set forth above, arises mainly from very rapid fluctuations in the instantaneous speed of the the recording medium and, hence, from the location of the informational transition with respect to the following clock transition.

If the recording medium is suddenly increased in lineal velocity after a clock marker has been picked up, the informational transition will be found in advance of its nominal position at the center of the cell, and the next following clock transition will be found in advance of the nominal end of the cell. On the other hand, if the velocity is suddenly decreased, the information transition will be found after its nominal cell center position, and the clock transition will be found after its nominal end of cell position. If these changes in position of a transition due to speed fluctuations of the recording medium cause a transition to occur while a gate is open for a transition of a different kind, an error signal will be produced.

Moving the informational transition from a nominal position 50 percent of the way to the next clock transition to a nominal position of, for example, 30 percent of the way, has been found to considerably decrease the probability of error signals being produced due to recording medium speed fluctuations or jitter. The gating pattern is, of course, adjusted for optimum operation with this modified pattern.

Accordingly, one object of the present invention is to provide a binary digital recording and playback system of increased reliability.

Another object of the present invention is to provide a binary digital recording and playback system which is less sensitive to the effects of recording medium jitter than systems hitherto available.

Still another object of the present invention is to provide methods of and means for modifying the usual pattern in a binary digital recording system to an unsymmetrical form less subject to errors caused by recording medium jitter.

A still further object of the present invention is to advance the informational transition in a binary digital recording and playback system to a position less subject to error from recording medium jitter.

Figure 2:
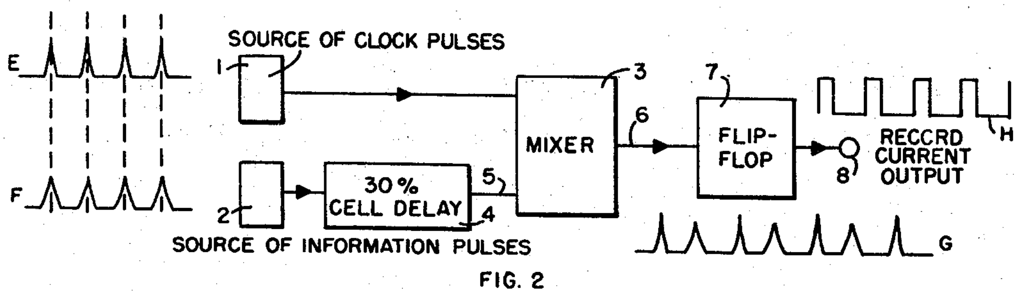
Figure 3:
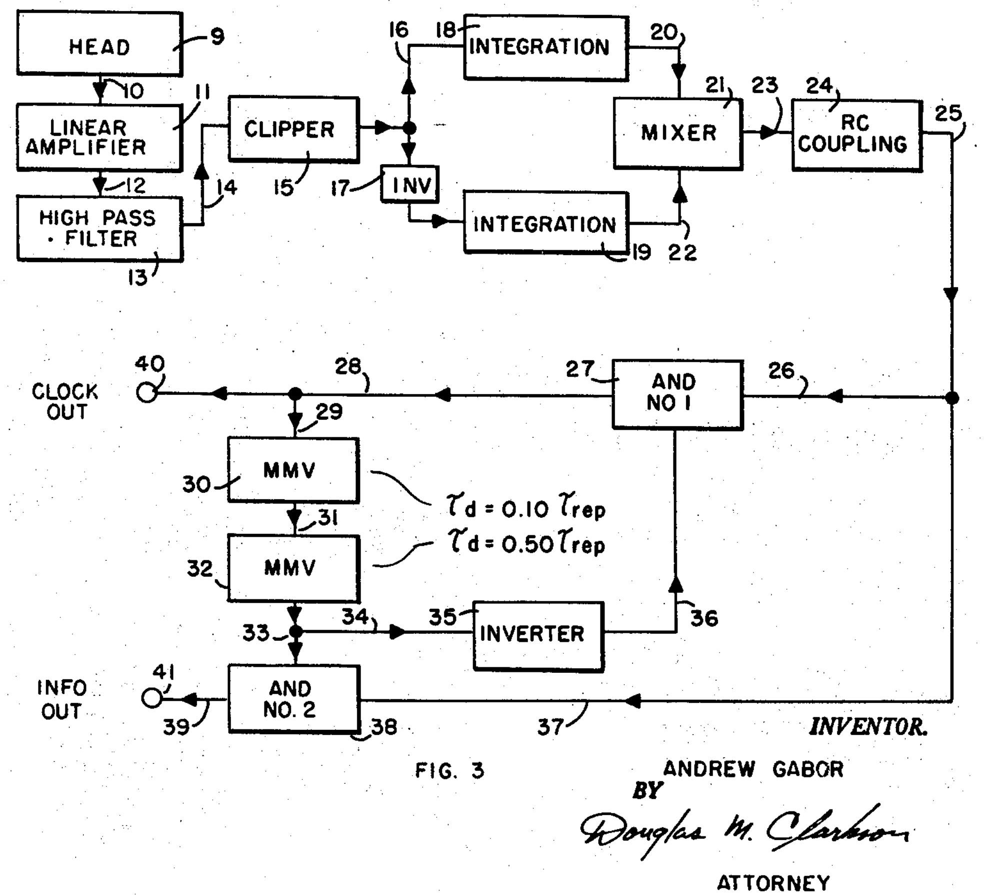

These and other objects of the invention will be apparent from the detailed description of the invention given in connection with the various figures of the drawings, in which:

FIG. 1 shows a pulse and timing diagrams useful in explaining the operation of the present invention, FIG. 2 shows a block diagram of a recording system in accordance with the present invention, and FIG. 3 shows a playback system, in block form, suitable for reproducing binary digital signals recorded in accordance with the present invention.

Reference is made to Ser. No. 26,538, filed May 3, 1960, now U.S. Pat. No. 3,217,329 for details of the high density recording/playback system typical of systems to which the advantages of the present invention may be applied. Further understanding of the system may be gained from an article entitled, "High Density Recording on Magnetic Tape," by Andrew Gabor published Oct. 16, 1959 at pages 72–75 of Electronics magazine, a McGraw-Hill publication.

According to the present invention, the timing of the informational transitions is changed in the transmitter from "one half cell delay" to approximately 30 percent of a cell delay, and the gate in the playback is opened from approximately the 10 percent point to the 60 percent point instead of from 25 percent to 75 percent points. The optimum points may vary slightly from system to system so that an exact determination may be desirable in a particular system.

FIG. 1 shows, on line A, pulse markers indicating the starting clock for one binary bit cell, the end of the cell clock and the informational transition at the center of the cell. On line B is shown a diagram representing the informational signal gate opening at 25 percent and closing at 75 percent of the nominal cell time. This shows that the informational transition may be 50 percent late or the cell ending clock transition 25 percent early, but that if these values are exceeded, the informational transition will fall outside its gate period or the clock transition will impinge on the time delegated to information, causing an error.

It has been found, according to the present invention, that a substantial improvement in reliability may be obtained by substantially advancing the time of occurrence of the informational transition from the center of the bit cell to a point, for example, around 25 to 30 percent of the bit cell, as shown at line C of FIG. 1 and by moving the information accepting gate to extend from about 10 percent to about 60 percent of the bit cell as shown on line D. Under these conditions, the information transition may be 100 percent late or the cell end transition 40 percent early before errors occur.

If it is assumed that the instantaneous tape speed may be fast or slow by the same factor N, the optimum time for closing the informational transition gate may be found by equating the informational transition position times N to the cell end position (100 percent) divided by N. Applying this formula to the 30 percent position of the informational transition yields 30 N equals 100 divided by N and N equal to 1.82, so that the closing of the gate should be at 54.6 percent of the cell length.

The earlier that the informational transition is placed in the cell, the greater the possible improvement in reliability with respect to this gating error. However, in high density recording, a practical limit is determined by the resolution of the recording and playback heads.

FIG. 2 shows a block diagram of one possible recording system for practicing the present invention. Clock pulses are derived from source 1 and informational pulses from source 2, synchronized with the clock pulses. The informational pulses are delayed by an amount equal to 30 percent of a cell time in a delay network 4 and are applied to a mixer 3 over a circuit 5. The clock pulses, applied to terminal 1, are mixed with the delayed informational pulses in mixer 3, and the combined pulses are applied to a flip-flop 7 over a circuit 6.

Typical clock pulses are shown at E, typical informational pulses at F, and the mixed pulses are shown at G. The flip-flop 7, actuated by the mixed pulses, generates an output recording current at 8, as shown at H. This recording current may be utilized to record transitions of the state of any suitable recording medium.

FIG. 3 shows a block diagram of a playback system suitable for use with magnetic recordings. Suitable means for coupling to the medium, such as pick-up head 9, feeds a linear amplifier 11 over circuit 10, which in turn feeds high pass filter 13 over a circuit 12. The output of the filter 13 is applied to a clipper 15 over a circuit 14, and the clipped output is applied to an integrator 18 over a line 16 and, after inversion in an inverter 17, to an integrator 19.

The outputs of the integrators 18 and 19, consisting of saw tooth waves, are applied to a mixer 21 over lines 20 and 22, respectively. The mixed saw tooth signals are applied to an RC coupling 24 over a line 23, resulting in a series of sharp pulses at 25 which, in effect, represent the recorded transitions on the recording medium. These pulses are applied to "and" gates 27 and 38 over lines 26 and 37, respectively.

The clock pulses are to pass through the "and" gate 27 over a line 28 to an output terminal 40, while the informational pulses are to pass through the "and" gate 38 and over a line 39 to an output terminal 41. The clock pulses are applied over the line 29 to a monostable multivibrator 30, which has an ON period of 10 percent of the repetition period and which, when it goes off, applies a pulse over a line 31 to a monostable multivibrator 32 having an ON period of 50 percent of the repetition period.

The output of the multivibrator 32 then will be a pulse starting 10 percent of a period after a clock pulse and lasting until 60 percent of a period after the clock pulse. This pulse, then, is 50 percent of a period long and is applied over a line 33 to an "and" gate 38 (see line D of FIG. 1) to pass only informational pulses and over a line 34 to be inverted in an inverter 35 for forming a gating signal over a line 36 to an "and" gate 27 to gate only clock pulses to an output point 40.

While only one embodiment of the present invention has been shown and described, many modifications will be apparent to those skilled in the art and within the spirit and scope of the invention as specifically set forth in the appended claims.

What is claimed is:

1. In a recording system, the combination of,
an extended recording medium,
a source of binary signals, and
means for impressing said signals upon said medium by means of reversals of the state of said recording medium to form contiguous recorded patterns on said medium,
wherein one of said binary values is represented solely by said reversals at signal bit boundaries and the second of said values is represented by said reversals at signal bit boundaries plus reversals in the vicinity of 30 percent of the distance from one bit boundary to the next.

2. In a recording system, the combination of,
an extended recording medium,
a source of binary signals, and
means for impressing said signals upon said medium by means of reversals of the state of said recording medium to form contiguous recorded patterns on said medium,
wherein one of said binary values is represented solely by said reversals at signal bit boundaries and the second of said values is represented by said reversals at signal bit boundaries plus reversals substantially in advance of the mid-point between said boundaries.

3. In a digital information recording and recovery system, the combination of,
a source of clock pulses,
a source of information pulses synchronized with said clock pulses selectively occurring with only some of said clock pulses and of the type in which a pulse in a cell bit interval of time represents a "1" and an absence of a pulse in a cell bit interval of time represents a "0,"
means for delaying pulses from said information source with respect to the pulses from said clock pulses by substantially 30 percent of a cell bit interval,
means for mixing said delayed pulses and said clock pulses to form a composite series of pulses consisting of said clock pulses and said delayed pulses, and
mean for generating recording current consisting of current of two values switched from one of said values to the other by each pulse in said composite series of pulses.

4. A method of storing binary encoded information on a magnetic recording medium comprising the steps,
recording information corresponding to one binary value solely by reversals at regularly spaced intervals on the recording medium and information corresponding to the other binary value by reversals of the same regular spacing plus a reversal substantially in advance of the mid-point between said reversals of the same regular spacing,
reading said recording from said medium,
deriving synchronizing information from said transitions at said regularly spaced intervals, and
interpreting the absence of a transition in an interval extending from 10 percent to 60 percent of the interval between transitions as said one binary value and the presence of a transition in said 10 percent to 60 percent interval as said other binary value.

5. In a recording system the combination of,
an extended recording medium,
a source of binary information signals,
a source of clock signals, and
means responsive to said information signals and said clock signals for recording one of said binary values solely by reversals on said medium at regular intervals and the other of said binary values as reversals at regular intervals plus reversals substantially in advance of the mid-point between said boundaries.

6. A recording system comprising,
a magnetic medium on which binary signals are recorded in non-return-to-zero form consisting of changes of flux between two values in a contiguous pattern with one binary value being represented solely by changes in flux at signal bit boundaries and the other binary value being represented by changes in flux at signal bit boundaries plus changes in flux substantially in advance of the mid-point between signal bit boundaries,
transducer means to read out the binary signals recorded on said medium to produce a train of pulses consisting of clock pulses occurring at regular intervals and corresponding to said flux changes at said signal bit boundaries and information pulses interspersed between said clock pulses substantially in advance of the mid-point between said clock pulses and corresponding to said flux changes between said signal bit boundaries, and means to detect the presence of each of said information pulses.

7. A recording system comprising, a magnetic medium on which binary signals are recorded in non-return-to-zero form consisting of changes of flux between two values in a contiguous pattern with one binary value being represented solely by changes in flux at signal bit boundaries and the other binary value being represented by changes in flux at signal bit boundaries plus changes in flux substantially in advance of the mid-point between signal bit boundaries, transducer means to read out the binary signals recorded on said medium to produce a train of pulses consisting of clock pulses occurring at regular intervals and corresponding to said flux changes at said signal bit boundaries and information pulses interspersed between said clock pulses substantially in advance of the mid-point between said clock pulses and corresponding to said flux changes between said signal bit boundaries, and means to separate said information pulses from said clock pulses.

8. A magnetic storage system comprising, a source of pulses read out from a magnetic storage medium consisting of clock pulses occurring at regular intervals and information pulses interspersed between said clock pulses substantially in advance of the mid-point between said clock pulses wherein one binary value is represented by the absence of an information pulse between two clock pulses and the other binary value is represented by the presence of an information pulse between two clock pulses, a first gate connected to receive said pulses and operable to pass said pulses when enabled and to block said pulses when disabled, a second gate connected to receive said pulses and operable to pass said pulses when enabled and to block said pulses when disabled, and means normally enabling said first gate and disabling said second gate and operable in response to each pulse passing through said first gate to disable said first gate and enable second gate for a predetermined time interval shorter than the interval between said clock pulses with the mid-point of said predetermined time interval occurring substantially in advance of the mid-point between clock pulses.

9. A magnetic storage system as recited in claim 8 wherein said predetermined time interval commences after about 10% of the time interval between clock pulses has elapsed and ends after about 50% of the time interval between clock pulses has elapsed.

10. A magnetic storage system as recited in claim 8 wherein said mid-point of said predetermined time interval occurs after about 30% of the time interval between clock pulses has elapsed.

11. A magnetic storage system comprising a source of pulses alternating in polarity read out from a magnetic storage medium consisting of clock pulses occurring at regular intervals and information pulses interspersed between said clock pulses substantially in advance of the mid-point between said clock pulses wherein one binary value is represented by the absence of an information pulse between two clock pulses and the other binary value is represented by the presence of an information pulse between two binary pulses, a first gate operable to pass applied pulses when enabled and block applied pulses when disabled, a second gate operable to pass applied pulses when enabled and to block applied pulses when disabled, means to convert said pulses from said source to the same polarity and apply the pulses to said first and second gates, and means normally enabling said first gate and disabling said second gate and operable in response to each pulse passing through said first gate to disable said first gate and enable said second gate for a predetermined time interval shorter than the interval between said clock pulses with the mid-point of said predetermined time interval occurring substantially in advance of the mid-point between said clock pulses.

References Cited

UNITED STATES PATENTS 2,917,726 12/1959 Golden et al. -------- 340—174

TERRELL W. FEARS, *Primary Examiner.*

BERNARD KONICK, *Examiner.*

A. I. NEUSTADT, *Assistant Examiner.*